United States Patent
Jeong

(10) Patent No.: US 10,564,389 B2
(45) Date of Patent: Feb. 18, 2020

(54) ELECTRONIC DEVICE AND METHOD OF CONTROLLING SAME

(71) Applicant: Samsung Electronics Co., Ltd., Gyeonggi-do (KR)

(72) Inventor: Jin-Gu Jeong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 334 days.

(21) Appl. No.: 15/600,967

(22) Filed: May 22, 2017

(65) Prior Publication Data

US 2017/0336597 A1 Nov. 23, 2017

(30) Foreign Application Priority Data

May 20, 2016 (KR) .................. 10-2016-0062413

(51) Int. Cl.
| | | |
|---|---|---|
| G02B 7/28 | (2006.01) | |
| G03B 13/18 | (2006.01) | |
| G03B 13/32 | (2006.01) | |
| G06T 7/50 | (2017.01) | |
| H04N 5/232 | (2006.01) | |

(52) U.S. Cl.
CPC ............ *G02B 7/285* (2013.01); *G03B 13/18* (2013.01); *G03B 13/32* (2013.01); *G06T 7/50* (2017.01); *H04N 5/23212* (2013.01)

(58) Field of Classification Search
CPC .. G02B 7/28; G02B 7/285; G06T 7/50; G06T 7/521; G01S 7/484; G01S 7/4911; G01S 17/88; G01S 17/36; G01S 17/48; G03B 13/18; G03B 13/30; G03B 13/32; G06F 1/325; G06F 3/0325; G06F 3/03; G06F 3/0425; H04N 5/23212; H04N 5/232121; H04N 5/232125; H04N 5/23241; H04N 5/232411; H04N 5/23251; H04N 5/23254
See application file for complete search history.

(56) References Cited

U.S. PATENT DOCUMENTS 8,275,413 B1 * 9/2012 Fraden .............. H04M 1/72522
455/344
9,313,376 B1 4/2016 Bertolami et al.
9,854,161 B2 * 12/2017 Jeong ...................... G06T 7/246
(Continued)

FOREIGN PATENT DOCUMENTS

KR 10-2015-0082262 A 7/2015

OTHER PUBLICATIONS

Stiller and Konrad;Estimating Motion in Image Sequences; Jul. 1999.
European Search Report dated Sep. 6, 2017.

*Primary Examiner* — John R Lee
(74) *Attorney, Agent, or Firm* — Cha & Reiter, LLC

(57) ABSTRACT

Disclosed are an electronic device and a method of controlling the same. An electronic device includes: a camera; a sensor module; and a processor, wherein the processor is configured to determine at least one of a movement of the electronic device and a movement of an object in images acquired by the camera, determine, based on the movement of the electronic device or the movement of the object, an output period for light outputted by the sensor module, and determine depth information of the images based on reflected light corresponding to the outputted light received by the camera.

15 Claims, 16 Drawing Sheets

(56) References Cited

U.S. PATENT DOCUMENTS

| | | |
|---|---|---|
| 9,947,064 B2 * | 4/2018 | Jeong .................... G06T 7/50 |
| 2014/0132721 A1 | 5/2014 | Martinez Bauza et al. |
| 2014/0240464 A1 | 8/2014 | Lee |
| 2015/0381965 A1 * | 12/2015 | Atanassov ......... H04N 5/23245 348/47 |
| 2017/0336597 A1 * | 11/2017 | Jeong .................. G06F 3/0325 |
| 2018/0270419 A1 * | 9/2018 | Laroia ................. H04N 5/2257 |
| 2019/0075257 A1 * | 3/2019 | Ayyagari .............. H04N 5/372 |

* cited by examiner

ELECTRONIC DEVICE AND METHOD OF CONTROLLING SAME

CLAIM OF PRIORITY

This application claims priority under 35 U.S.C. § 119(a) to Korean Application Serial No. 10-2016-0062413, which was filed in the Korean Intellectual Property Office on May 20, 2016, the entire content of which is hereby incorporated by reference.

TECHNICAL FIELD

The present disclosure relates to an electronic device and a method of controlling the same.

BACKGROUND

Recently, mobile devices have increasingly been manufactured with image capture devices such as cameras so that the functions of mobiles devices and cameras have converged in a single device. In order to provide added functionality, cameras in mobile device may be provided with an active sensor and a passive sensor. The reason why active sensors are used in mobile device is that there is a limit in how much depth information in images can be acquired by passive sensors. Active sensors, which output light that are reflected by objects in an image field, may do a better job of allowing the camera or an image sensor to detect depth information of the object, i.e. the distances of each object in the image field from the mobile device. However, active sensors may consume a large amount of power. Therefore, an efficient method of operating active sensors is required.

Methods that use active sensors to generate a depth map may include a Structured Light (SL) method and a Time of Flight (ToF) method as illustrated in FIGS. 1 and 2, respectively. The SL type illustrated in FIG. 1 refers to a method of outputting an infrared light (IR) through a stripe or dot-shaped slit and detecting a change in an IR pattern through a camera. The detected IR pattern can be used to generate the depth map. The ToF type illustrated in FIG. 2 refers to a method of directly outputting the IR towards a target object and measuring the time it takes for the reflected light to return from the target object to the image sensor, and determining the distance of the target object from the sensor using the measured time. The determined distances can be used to generate the depth map.

SUMMARY

The active sensor consumes a large amount of power due to the nature of its operation, i.e. the active sensor has to output light, for example IR light. As described above, the active sensor may output an infrared light for a target object and generate a depth map based on a pattern of the output infrared light or a time it takes for the output infrared light to be reflected. Accordingly, the infrared light generally is continuously and repeatedly output to the target object. Accordingly, a large amount of power is consumed. Since a mobile device such as a smart phone has limited power that can be used, large power consumption is not desirable.

The present disclosure provides an electronic device capable of generating a depth map having high accuracy while minimizing power consumption in the mobile device such as the smart phone.

The present disclosure provides a computer-readable recording medium capable of generating a depth map having high accuracy while minimizing power consumption in the mobile device such as the smart phone.

The present disclosure provides a method of controlling an electronic device capable of generating a depth map having high accuracy while minimizing power consumption in the mobile device such as the smart phone.

In accordance with an aspect of the present disclosure, an electronic device is provided. The electronic device includes: a camera; a sensor module; and a processor, wherein the processor is configured to determine at least one of a movement of the electronic device and a movement of an object in images acquired by the camera, determine, based on the movement of the electronic device or the movement of the object, an output period for light output by the sensor module, and determine depth information of the images based on reflected light corresponding to the outputted light received by the camera.

In accordance with another aspect of the present disclosure, a non-transitory computer-readable recording medium storing instructions configured to cause a processor to perform at least one operation is provided. The at least one operation includes: determining at least one of a movement of an electronic device and a movement of an object in images acquired by a camera; determining based on the movement of the electronic device or the movement of the object, an output period for light outputted by a sensor module; and determining depth information of the images based on reflected light corresponding to the outputted light received by the camera.

In accordance with another aspect of the present disclosure, a method of controlling an electronic device is provided. The method includes: determining at least one of a movement of an electronic device and a movement of an object in images acquired by a camera; determining, based on the movement of the electronic device or the movement of the object, an output period for light outputted by a sensor module; and determining depth information of the images based on reflected light corresponding to the outputted light received by the camera.

According to various embodiments of the present disclosure, a mobile device such as a smart phone can generate a depth map having high accuracy while minimizing power consumption.

It will be apparent to those skilled in the art that the advantages of the present disclosure are not limited to those mentioned above, and the present disclosure includes various implicit advantages.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
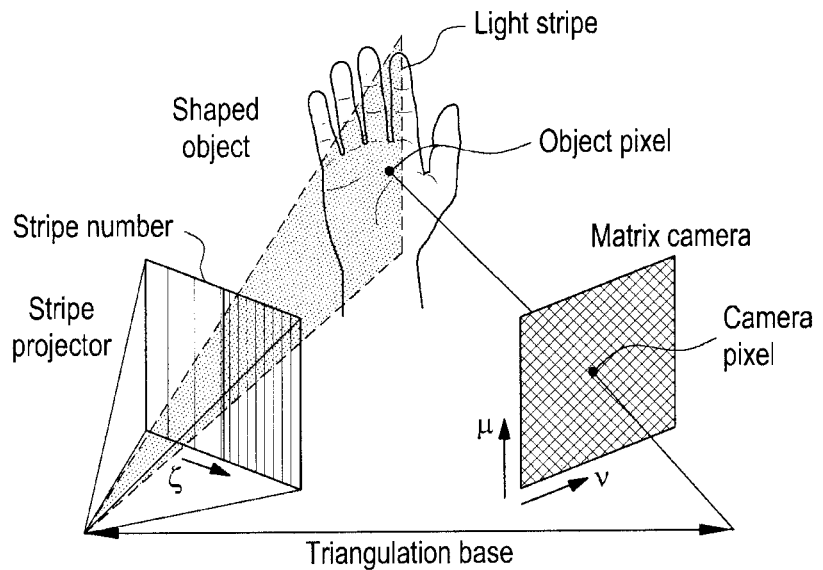
FIG. 1 and FIG. 2 illustrate examples for describing operation principles of an active sensor according to the prior art.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In the description of the drawings, similar reference numerals may be used to designate similar elements.

As used herein, the expression "have," "may have," "include," or "may include" refers to the existence of a corresponding feature (e.g., numeral, function, operation, or constituent element such as component), and does not exclude one or more additional features.

In the present disclosure, the expression "A or B," "at least one of A or/and B," or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B.

The expression "a first," "a second," "the first," or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HIVID)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Figure 3:
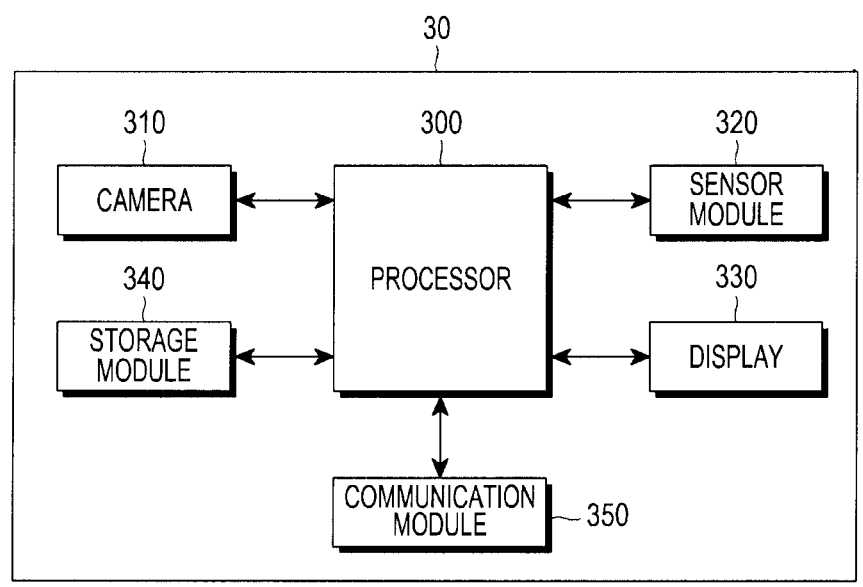
FIG. 3 is a block diagram of an electronic device according to one embodiment of the present disclosure.

FIG. 3 is a block diagram of an electronic device according to one embodiment of the present disclosure.

Referring to FIG. 3, an electronic device 30 according to one embodiment of the present disclosure may include a processor 300, a camera 310, a sensor module 320, a display 330, a storage module 340, and a communication module 350.

The processor 300 may control various elements of the electronic device 30 (for example, the camera 310, the sensor module 320, the display 330, the storage module 340, and the communication module 350) and/or execute calculations or data processing for communication. The processor may include, for example, an Application Processor (AP). The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The camera 310 may include a device/module capable of photographing a still image and a video. The camera 310 may include one or more image sensors (for example, a front sensor or a back sensor), a lens, an Image Signal Processor (ISP), or a flash (for example, an LED or a xenon lamp). The image sensor may include, for example, a Complementary Metal Oxide Semiconductor (CMOS) image sensor. The image sensor may be referred to as a "passive sensor" in this specification.

The sensor module 320 may measure a physical quantity or detect an operating state of the electronic device 30, and convert the measured or detected information into an electronic signal. The sensor module 320 may include a gyro sensor, an acceleration sensor, and an IR transmitter and reception sensor. The IR transmitter and reception sensor or the sensor module 320 may be referred to as an "active sensor" in this specification. According to various embodiments of the present disclosure, the active sensor and the passive sensor may be implemented as one module or implemented as separated modules.

The display 330 may include a touch screen and receive, for example, a touch input, a gesture input, a proximity input, or a hovering input using an electronic pen or a user's body part such as a finger.

The storage module 340 may store various pieces of data. The memory may include a volatile memory and a non-volatile memory.

The communication module 350 may transceive communication between the electronic device 30 and an external device.

Figure 4A:
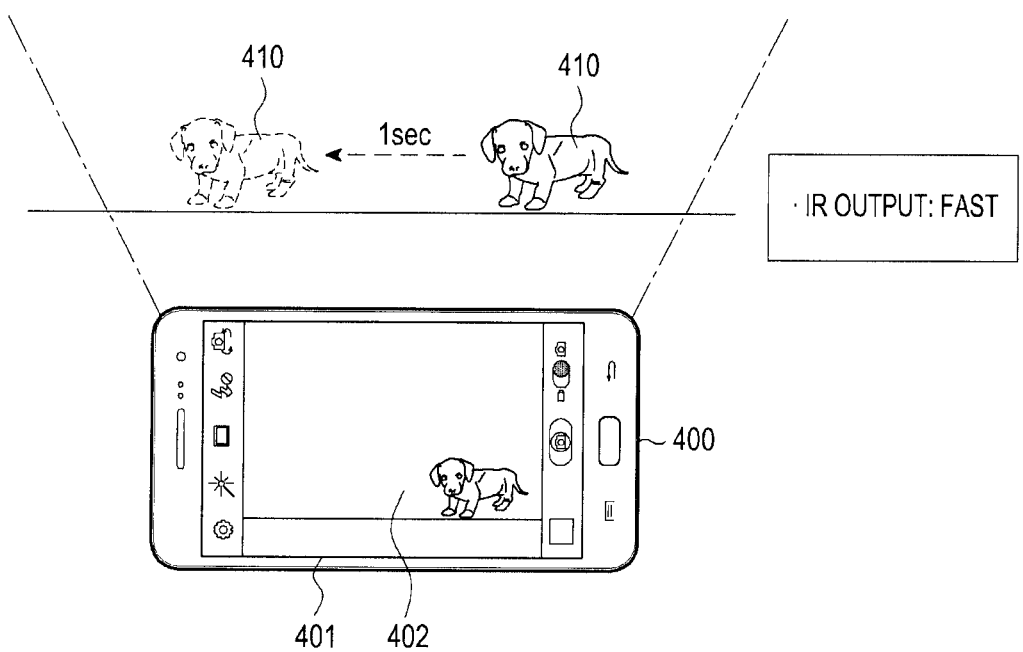
FIG. 4A and FIG. 4B illustrate examples showing a case where an electronic device outputs light based on a short period according to one embodiment of the present disclosure.
Figure 4B:
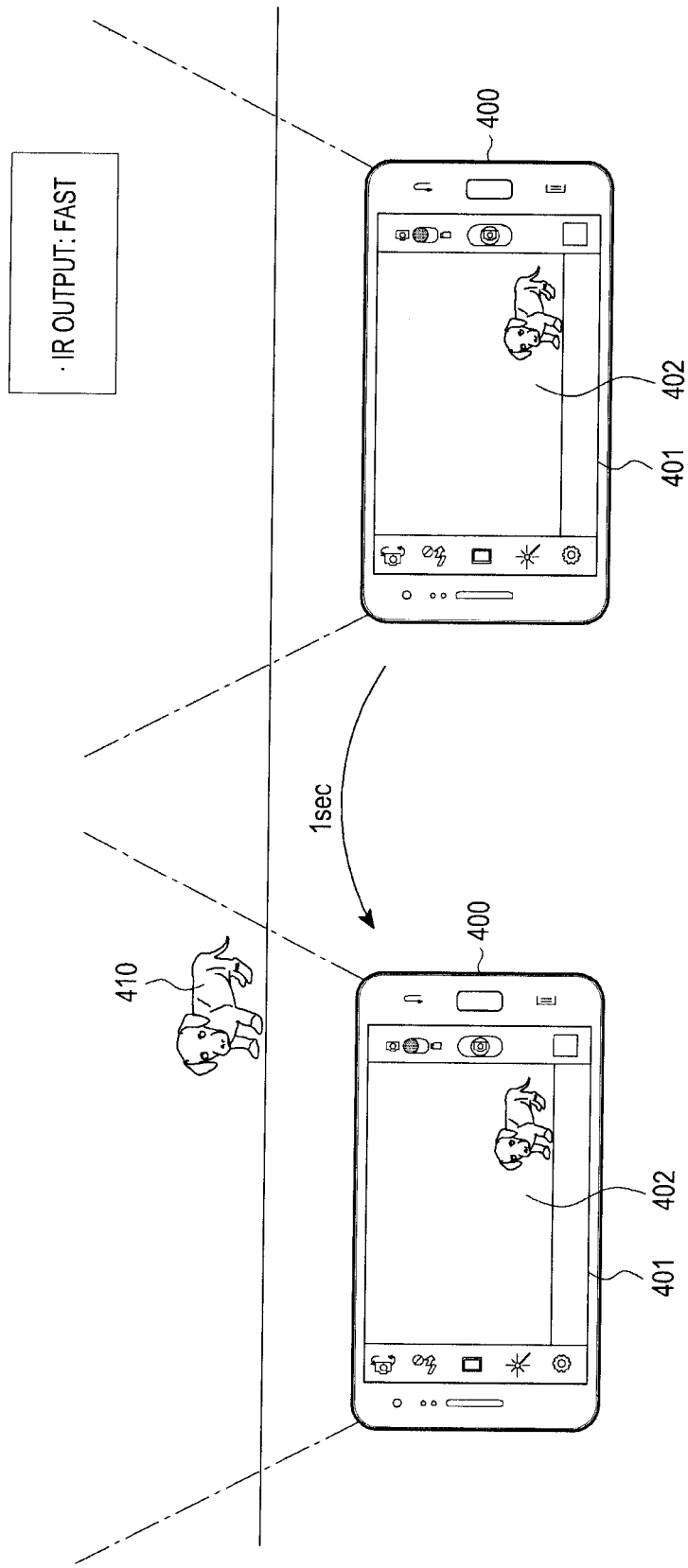

FIGS. 4A and 4B illustrate examples showing a case where an electronic device outputs light based on a short period according to one embodiment of the present disclosure.

Referring to FIG. 4A, an electronic device 400 according to one embodiment of the present disclosure may acquire one or more images 402 through a camera (not shown). The image 402 may be displayed on a display 401. The image 402 may include, for example, an object 410 moving at a high speed (for example, 10 m/s). The processor of the electronic device 400 may determine, for example, the moving object. The processor may determine a movement speed of the moving object 410. For example, the processor may calculate a movement distance of the object 410 based on an angle of view of a lens of the camera. The movement distance may be calculated by equation (1) below.

$$D*\tan(a/2)*2=L \qquad \text{equation (1)}$$

Figure 9:
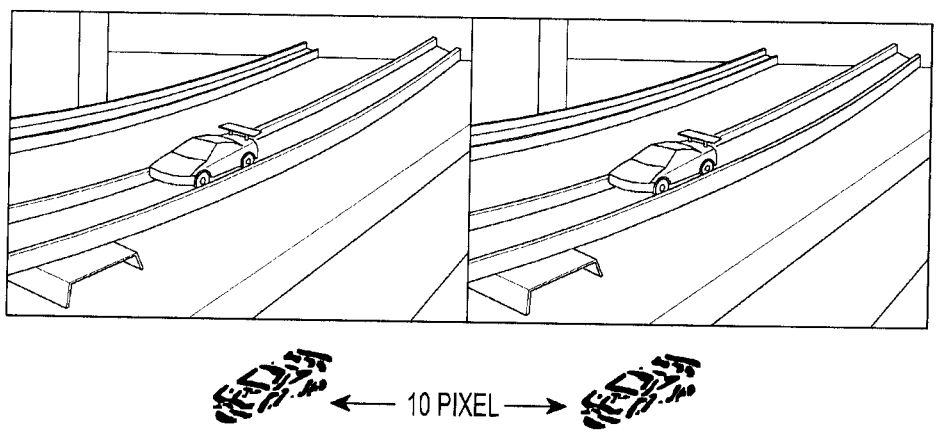
FIG. 9 illustrates an example showing a function or an operation for extracting movement information by an electronic device according to one embodiment of the present disclosure.
Figure 14A:
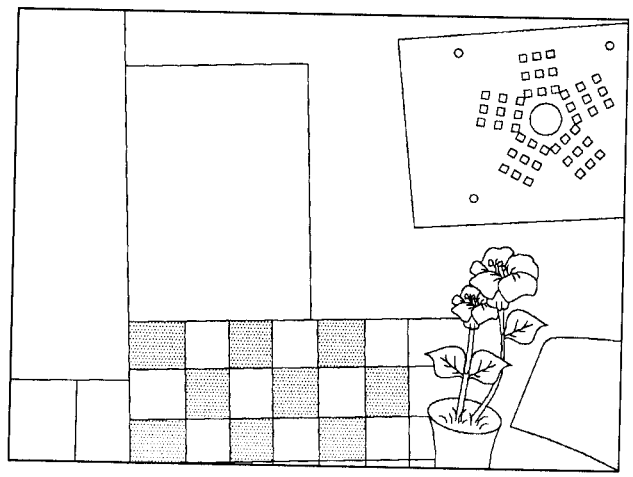
FIG. 14A, FIG. 14B and FIG. 14C illustrate examples showing images acquired using an active sensor and a passive sensor according to one embodiment of the present disclosure.
Figure 14B:
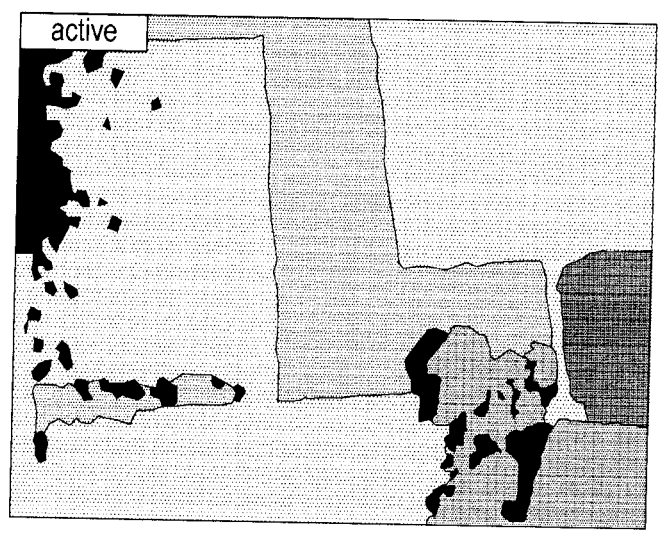
Figure 14C:
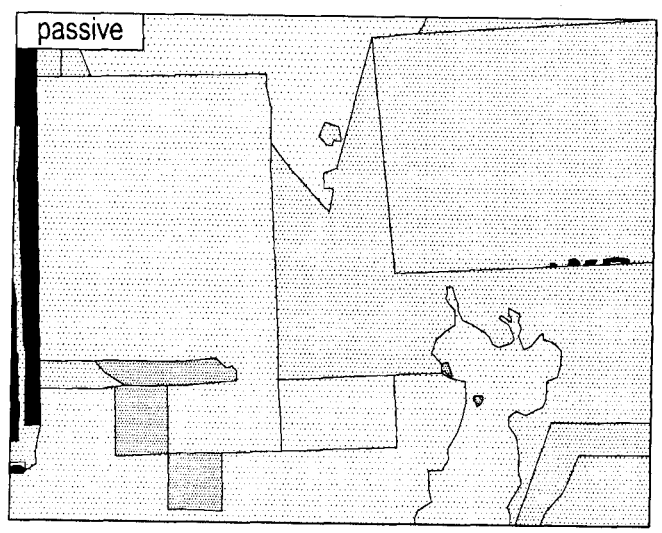

In equation (1), D may denote a distance (D) from the electronic device 400 to the object 410, "a" may denote an angle of view, and L may denote a distance covered by the object when it moves from one end of the display 420 (e.g. the right side) to the other end (e.g. the left side). The distance D may be determined based on the data, e.g. depth information, acquired by the active sensor. The processor may convert the image acquired by the active sensor into distance information to determine the distance D. FIG. 14B illustrates an image generated by photographing a particular space illustrated in FIG. 14A through both the active sensor and the passive sensor. FIG. 14C illustrates an image generated by photographing the particular space through only the passive sensor. The processor may calculate the distance D from the electronic device 400 to the moving object based on an image including depth information as illustrated in FIG. 14B. For example, when the distance between the object and the electronic device is 5 m and the angle of view is 6.5 degrees, a distance L may be determined as 0.567 m based on equation (1). Further, as illustrated in FIG. 9, when the moving object 410 has moved by a unit of 10 pixels on the display 420 (that is, when a difference between frames for the object 410 corresponds to 10 pixels) and a resolution of the image corresponds to 640*480, the processor may use the equation of 10:640=X:0.567 and calculate X, where X represented the actual distance travelled by the object. By calculating the movement distance X, the processor may determine that the object 410 has moved by 0.0088 m. Further, for example, when an output of the frame illustrated in FIG. 9 corresponds to 120 FPS, a time Y for between frames may be calculated using 1:120=Y:100 (msec) and Y may be determined as 0.83 (msec). Accordingly, the processor may determine a speed of the moving object 410 as 10.6 m/s (that is, 0.0088(X)/0.00083(Y)).

The above described method of calculating the movement distance L or the movement distance X is only an example for describing the present disclosure and other various methods can be applied to determine the movement distance L or the movement distance X.

Figure 7A:
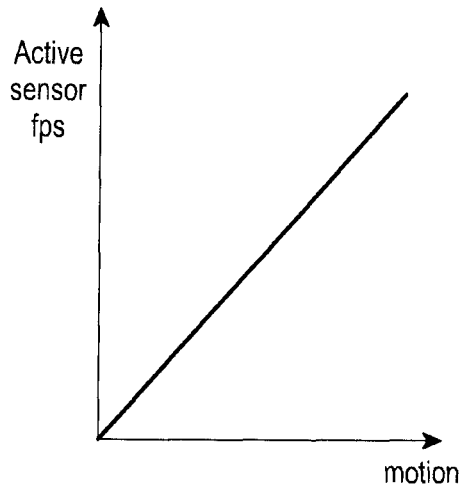
FIG. 7A, FIG. 7B, FIG. 7C and FIG. 7D are charts showing relationships between the light output period and motion according to one or more embodiments of the present disclosure.

When the acquired image 402 includes the object 410 that is moving at a high speed (that is, when the object moving at the high speed is photographed by the user), the processor of the electronic device 400 may control the sensor module (for example, the sensor module 320) included in the electronic device 400 to output light (for example, an infrared light) according to a period (for example, 90 Frames Per Second (FPS)) based on the movement speed of the object 410. For example, a relatively high FPS may be used when the object is moving at a relatively high speed. In FIG. 4A, since the object 410 is moving at a relatively high speed, the processor may make a control to output the light according to a relatively short period. The light may be output only for some areas of the images where the object is located. A period on which the light is output may be predetermined according to various methods, for example, as shown in graphs illustrated in FIGS. 7A to 7D. According to one embodiment of the present disclosure, the processor may control the sensor module to output the light according to a period selected by the user regardless of the movement speed of the object 410 as illustrated in FIG. 8.

Referring to FIG. 4B, there may be a case where the electronic device 400 that photographs the image 402 moves at a high speed rather than the object moving. When the electronic device 400 moves at a high speed (for example, 10 m/s), the processor of the electronic device 400 may also control the sensor module to output the light according to a period corresponding to the movement speed of the electronic device 400. In FIG. 4B, since the electronic device 400 is moving at a relatively high speed, the processor may make a control to output the light according to a relatively short period.

Figure 5A:
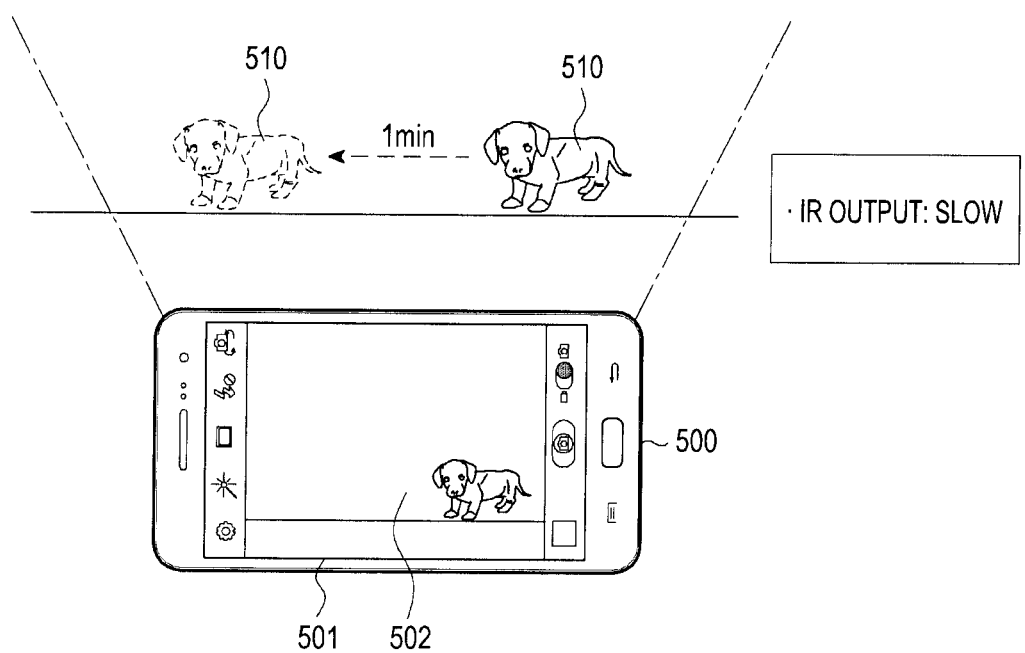
FIG. 5A and FIG. 5B illustrate examples showing a case where an electronic device outputs light based on a long period according to one embodiment of the present disclosure.
Figure 5B:
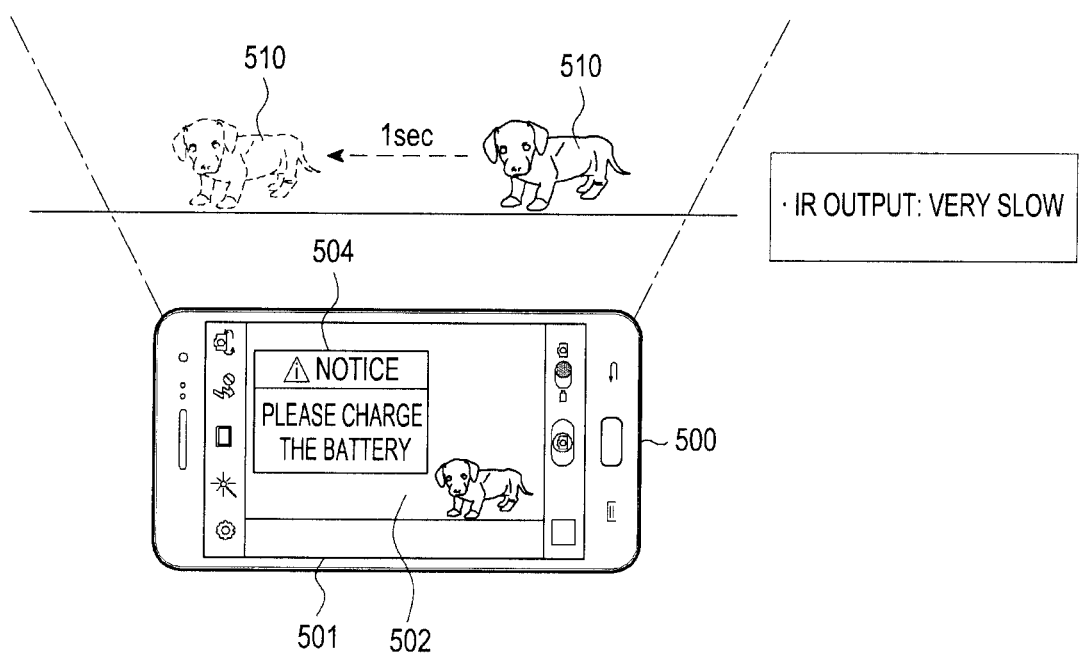

FIGS. 5A and 5B illustrate examples showing a case where an electronic device outputs light based on a long period according to one embodiment of the present disclosure.

FIG. 5A illustrates an example of a case where an object 510 included in an image 502, which may be a plurality of images, moves at a relatively low speed (for example, 0.16 m/s). In this case, an electronic device 500 according to one embodiment of the present disclosure may control a sensor module (for example, the sensor module 320) included in the electronic device 500 to output the light according to a period (for example, 30 FPS) corresponding to the low speed. The image 502 may be displayed on a display 501 included in the electronic device 500.

If a battery included in the electronic device 500 is required to be charged (for example, if the charged amount of the battery becomes equal to or lower than a predetermined level), the processor may control the sensor module to output the light according to a long period (for example, 10 FPS) even when the object 510 moves at a high speed as illustrated in FIG. 5B. The period of the light output when the battery is required to be charged may be longer than the period of the light output when the object moves at the low speed (FIG. 5A). When the battery included in the electronic device 500 is required to be charged, a notification message 504 may be displayed on the display 501.

Figure 6:
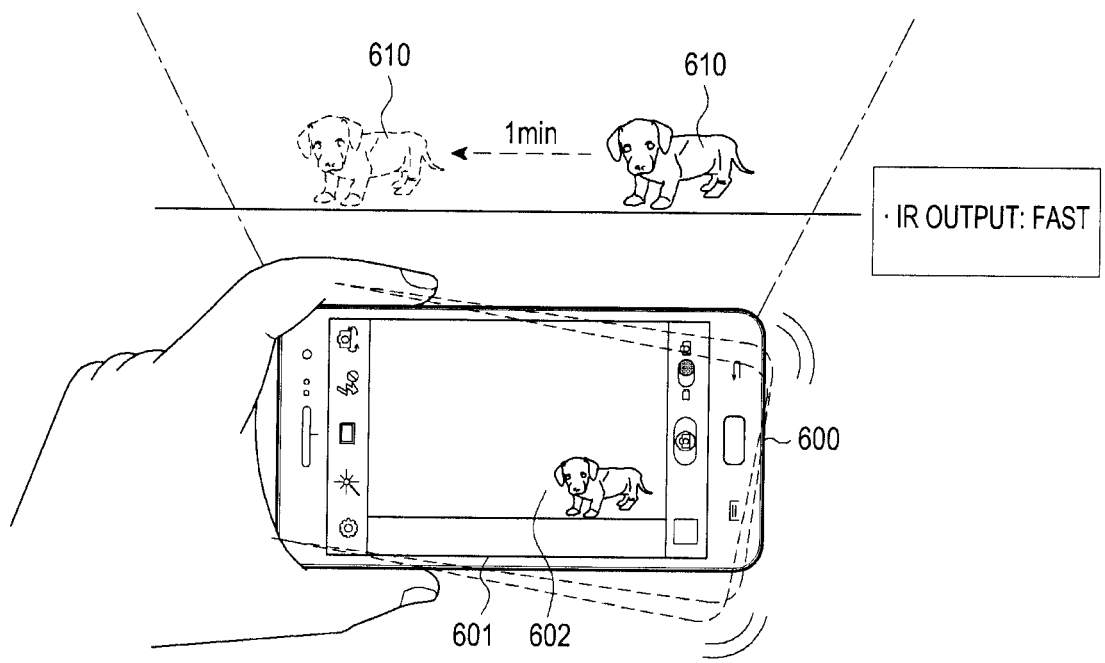
FIG. 6 illustrates an example showing a case where light is output when an electronic device moves according to one embodiment of the present disclosure.

FIG. 6 illustrates an example showing a case where light is output when an electronic device moves according to one embodiment of the present disclosure.

Referring to FIG. 6, an electronic device 600 according to one embodiment of the present disclosure may have a movement due to various environmental (in other words, external) factors such as a user's hand-shake while photographing the image 602. When a factor value related to the movement of the electronic device 600 is larger than or equal to a predetermined value. That is, when a degree of the movement (e.g. shake) of the electronic device 600 is large, the processor of the electronic device 600 may control to output the light according to a period shorter than a light output period corresponding to the movement of the object 610 even though the object 610 moves at a low speed. That is, according to one embodiment of the present disclosure, when outputting the light, the processor may first take into account the movement of the electronic device 600 before taking into account the movement of the object 610. However, according to another embodiment of the present disclosure, the movement of the object 610 may be more preferentially considered than the movement of the electronic device 600. The degree of the movement of the electronic device 600 may be acquired by, for example, a gyro sensor and/or an acceleration sensor. The image 602 may be displayed on a display 601 included in the electronic device 600.

According to one embodiment of the present disclosure, the processor may match RGB information of the image acquired by the passive sensor with depth information of the image acquired by the active sensor and generate a three dimensional image for the image acquired by the electronic device.

The examples of the long period (for example, 30 FPS or 10 FPS) and the short period (for example, 90 FPS) described in the present disclosure are used for convenience of the description of the present disclosure. The periods may be predetermined during a process of manufacturing the electronic device according to one embodiment of the present disclosure or may be determined by a user's selection.

FIGS. 7A to 7D are charts showing relationships between the light output period of a sensor module according and motion of the electronic device or the object to one embodiment of the present disclosure.

According to one embodiment of the present disclosure, the output light may be output through various methods. For example, a period (for example, FPS) of the output light may be predetermined in direct proportion to the movement of a particular object or the movement of the electronic device (e.g. the distance or speed by the movement) as illustrated in FIG. 7A.

Figure 7B:
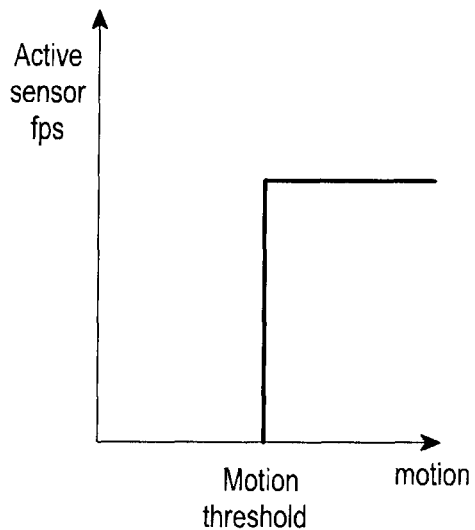
Figure 8:
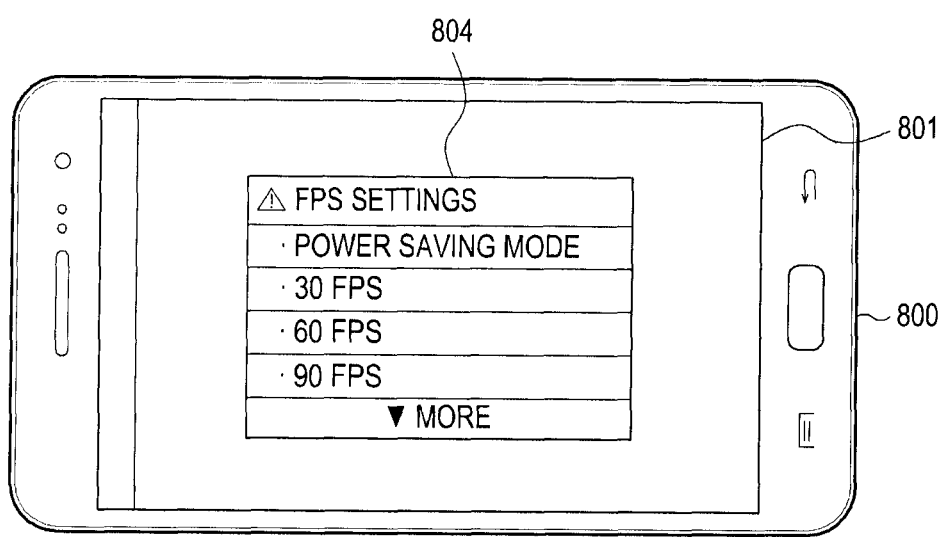
FIG. 8 shows a user interface of a function or an operation for setting a light output period of a sensor module by the user according to one embodiment of the present disclosure.

Referring to FIG. 7B, when a particular object in images or an electronic device has a speed higher than or equal to a threshold speed (or when a movement amount of the particular object or the electronic device is larger than or equal to a predetermined pixel value), the light according to one embodiment of the present disclosure may be controlled to be output according to a predetermined period.

Figure 7C:
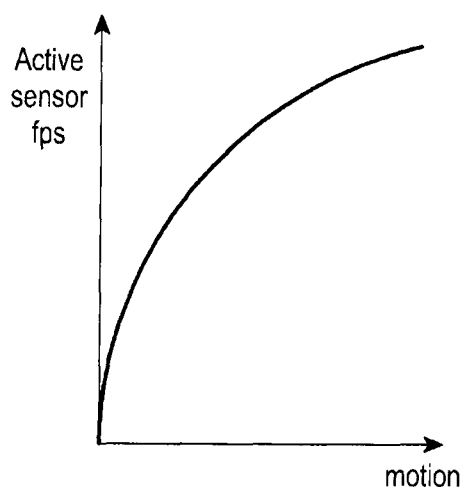
Figure 7D:
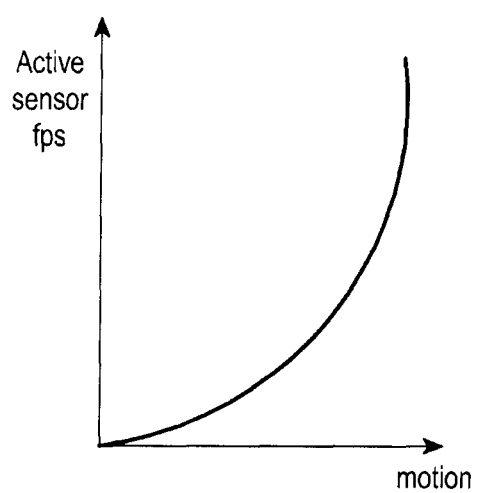

Referring to FIGS. 7C and 7D, the light according to various embodiments of the present disclosure may be controlled to be output according to an increasing period with varying rates of change based on the movements.

The electronic device according to various embodiment of the present disclosure to control the light output period as illustrated in FIGS. 7A to 7D may store a mapping table including light output periods corresponding to the particular movements of the electronic device or the object (for example, a movement speed of the particular object or the electronic device, or a degree of a movement (or change) of a feature point for the moving object). The electronic device may control the light output period based on the mapping table.

FIG. 8 shows a user interface of a function or an operation for setting a light output period of a sensor module by the user according to one embodiment of the present disclosure.

Referring to FIG. 8, according to one embodiment of the present disclosure, the light output period may be determined according to an input received from the user regardless of the movement of the object/electronic device. In order to receive a selection specifying the output period from the user, a processor of an electronic device 800 may display an output period setting screen 804 on a display 801.

FIG. 9 illustrates an example showing a function or an operation for extracting movement information by an electronic device according to one embodiment of the present disclosure.

Referring to FIG. 9, the electronic device according to one embodiment of the present disclosure may extract (in other words, recognize) a moving object illustrated in FIG. 9. For example, the processor of the electronic device may extract, for example, the object based on the fact that the object is located at different places in two images, thereby indicating that the object is moving. The processor may determine whether the images acquired by the electronic device includes the moving object by comparing the images.

According to one embodiment of the present disclosure, the function or the operation for extracting the object may be performed based on, for example, a function or an operation for comparing feature points for a particular object, also known as feature point matching. FIG. 9 illustrates a case where a difference between frames shows a movement of a particular object corresponds to 10 pixels for convenience of the description of the present disclosure. As described above, according to one embodiment of the present disclosure, the processor may determine the light output period according to various methods illustrated in FIGS. 7A to 7D based on the degree of the movement of the feature point.

According to one embodiment of the present disclosure, when the movement value (e.g. distance or speed) of the electronic device detected by the sensor module is larger than a predetermined value, the processor may control to make the output light period shorter.

According to one embodiment of the present disclosure, when the movement value of the electronic device detected by the sensor module is equal to or smaller than the predetermined value, the processor may determine the output light period according to the movement of the object in the image.

According to one embodiment of the present disclosure, the images may include preview images acquired by the camera.

According to one embodiment of the present disclosure, the processor may determine the movement of the image based on a difference image for the acquired image or a change in a location of the feature point for the target object.

According to one embodiment of the present disclosure, a period on which an image is acquired by the camera may be set to be shorter than the light output period.

Figure 10:
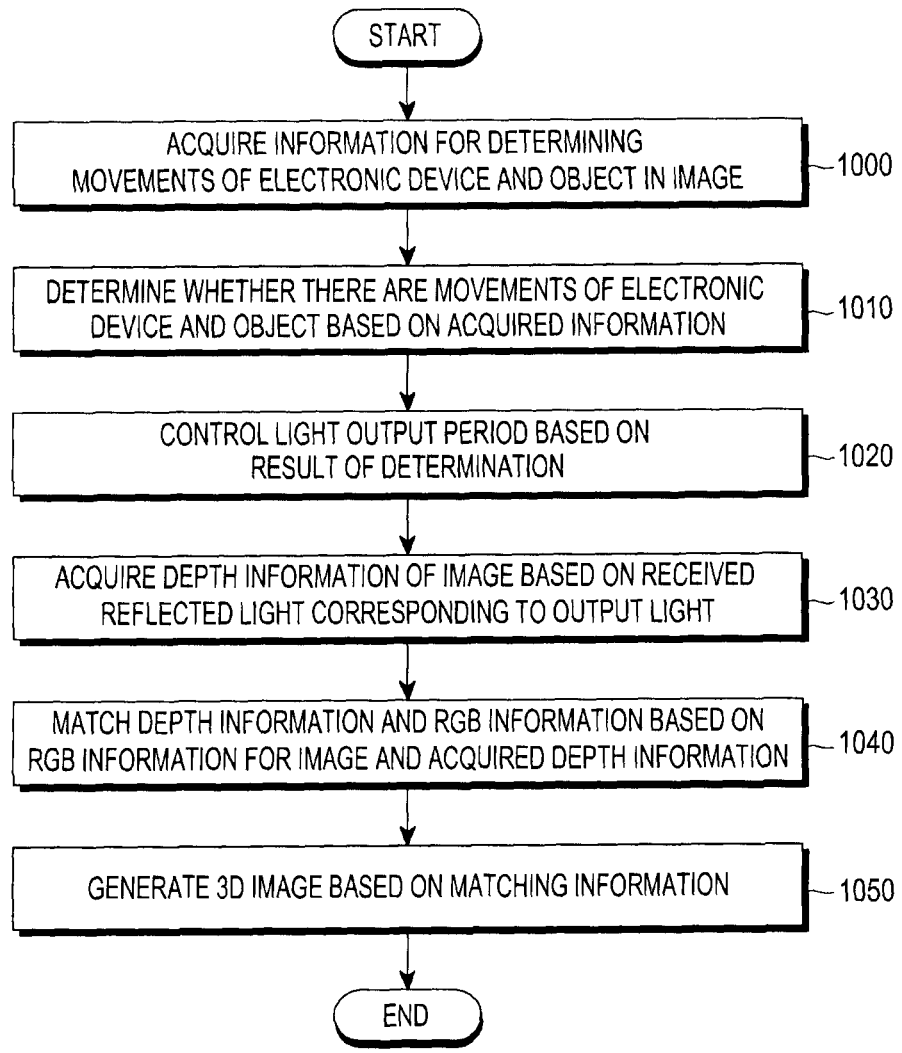
FIG. 10 is a flowchart showing a method of controlling an electronic device according to one embodiment of the present disclosure.

FIG. 10 is a flowchart showing a method of controlling an electronic device according to one embodiment of the present disclosure.

Referring to FIG. 10, the method of controlling the electronic device according to one embodiment of the present disclosure may include an operation 1000 for acquiring information to determine movements of the electronic device and the object in the images.

The method of controlling the electronic device according to one embodiment of the present disclosure may include an operation 1010 for determining whether the electronic device and the object move based on the acquired information.

The method of controlling the electronic device according to one embodiment of the present disclosure may include an operation 1020 for controlling a light output period based on a result of the determination.

The method of controlling the electronic device according to one embodiment of the present disclosure may include an operation 1030 for acquiring depth information of the image based on received reflected light corresponding to the output light.

The method of controlling the electronic device according to one embodiment of the present disclosure may include an operation 1040 for matching RGB information of the image and the acquired depth information, i.e. matching the data from the passive sensor and the active sensor.

The method of controlling the electronic device according to one embodiment of the present disclosure may include an operation 1050 for generating a three dimensional image for the image acquired by the electronic device based on the matching information.

The description of the electronic device according to various embodiments of the present disclosure described in connection with FIGS. 3 to 9 may be equally applied to the method of controlling the electronic device according to various embodiments of the present disclosure.

Figure 11:
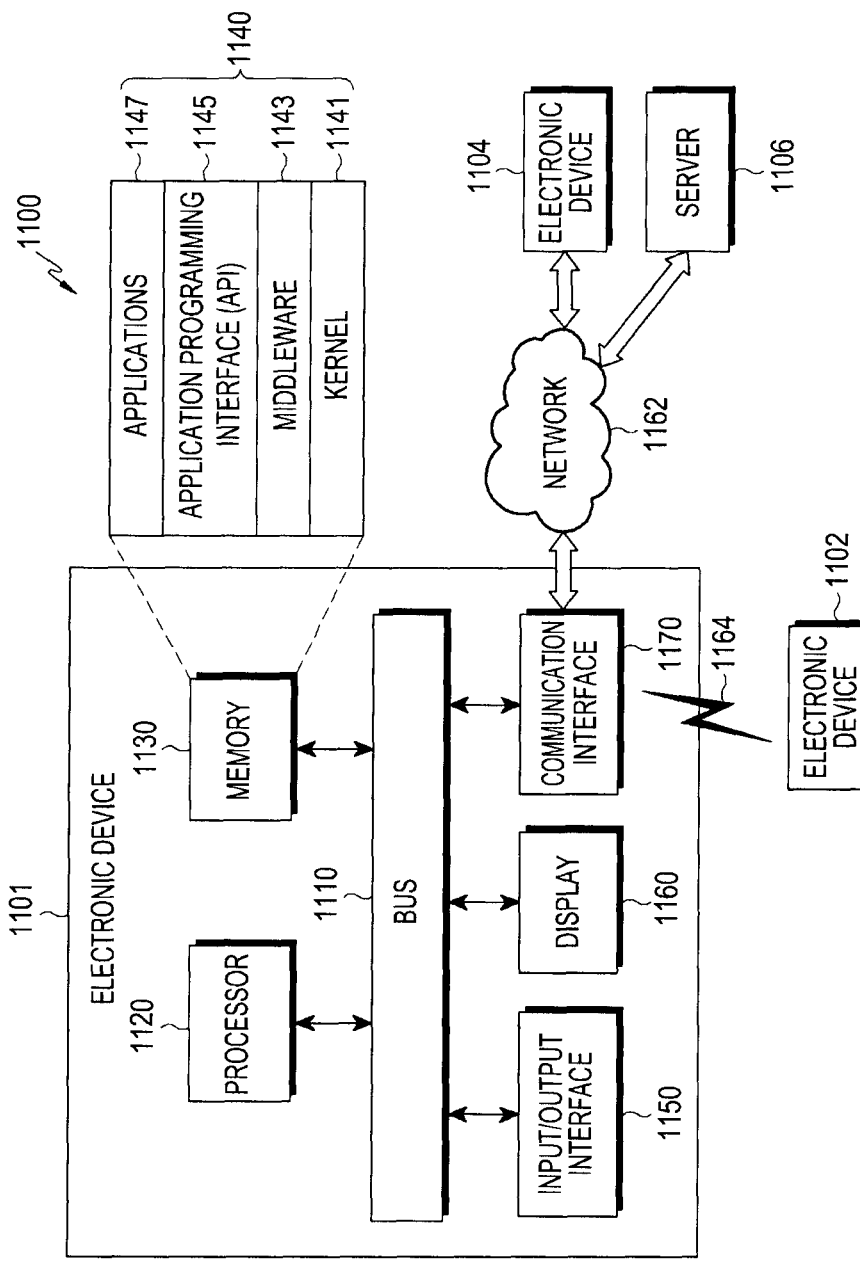
FIG. 11 illustrates a block diagram of an electronic device within a network environment according to one embodiment of the present disclosure.

FIG. 11 illustrates a block diagram of an electronic device within a network environment according to one embodiment of the present disclosure.

An electronic device 1101 within a network environment 1100, according to one embodiment, will be described with reference to FIG. 11. The electronic device 101 may include a bus 1110, a processor 1120, a memory 1130, an input/output interface 1150, a display 1160, and a communication interface 1170. In some embodiments, the electronic device 1101 may omit at least one of the elements, or may further include other elements.

The bus 1110 may include, for example, a circuit that interconnects the components 1110 to 1170 and delivers communication (for example, a control message and/or data) between the components 1110 to 1170.

The processor 1120 may include one or more of a Central Processing Unit (CPU), an Application Processor (AP), and a Communication Processor (CP). The processor 1120, for example, may carry out operations or data processing relating to the control and/or communication of at least one other element of the electronic device 1101.

The memory 1130 may include a volatile and/or non-volatile memory. The memory 130 may store, for example, instructions or data relevant to at least one other element of the electronic device 101. According to an embodiment, the memory 1130 may store software and/or a program 1140. The program 1140 may include, for example, a kernel 1141, middleware 1143, an Application Programming Interface (API) 1145, and/or application programs (or "applications") 1147. At least some of the kernel 1141, the middleware 1143, and the API 1145 may be referred to as an Operating System (OS).

For example, the kernel 1141 may control or manage the system resources (for example, the bus 1110, the processor 1120, the memory 1130, and the like) that are used to execute operations or functions implemented in the other programs (for example, the middleware 1143, the API 1145, and the application programs 1147). Furthermore, the kernel 1141 may provide an interface through which the middleware 1143, the API 1145, or the application programs 1147 may access the individual elements of the electronic device 1101 to control or manage the system resources.

The middleware 1143 may function as, for example, an intermediary for allowing the API 1145 or the application programs 1147 to communicate with the kernel 1141 to exchange data.

Furthermore, the middleware 1143 may process one or more task requests, which are received from the application programs 1147, according to priorities thereof. For example, the middleware 1143 may assign priorities for using the system resources (for example, the bus 1110, the processor 1120, the memory 1130, and the like) of the electronic device 1101 to one or more of the application programs 1147. For example, the middleware 1143 may perform scheduling or loading balancing on the one or more task requests by processing the one or more task requests according to the priorities assigned to the one or more application programs.

The API 1145, which is an interface through which the applications 1147 control functions provided from the kernel 1141 or the middleware 1143, may include, for example, at least one interface or function (for example, instruction) for file control, window control, image processing, text control, and the like.

The input/output interface 1150 may function as, for example, an interface that can forward instructions or data, which are input from a user or an external device, to the other element(s) of the electronic device 1101. Furthermore, the input/output interface 1150 may output instructions or data, which are received from the other element(s) of the electronic device 1101, to the user or the external device.

Examples of the display 1160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 1160 may display, for example, various types of contents (for example, text, images, videos, icons, symbols, and the like) for a user. The display 1160 may include a touch screen and may receive, for example, a touch, gesture, proximity, or hovering input using an electronic pen or the user's body part.

The communication interface 1170 may configure communication, for example, between the electronic device 1101 and an external device (for example, a first external electronic device 1102, a second external electronic device 1104, or a server 1106). For example, the communication interface 1170 may be connected to a network 162 through wireless or wired communication to communicate with the external device (for example, the second external electronic device 1104 or the server 1106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 164. The short range communication 164 may include at least one of, for example, Wi-Fi, Bluetooth, Near Field Communication (NFC), Global Navigation Satellite System (GNSS), and the like. The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a communication network such as a computer network (for example, a LAN or a WAN), the Internet, and a telephone network.

Each of the first and second external electronic devices 1102 and 1104 may be of the same or a different type from the electronic device 1101. According to an embodiment, the server 1106 may include a group of one or more servers. According to various embodiments, all or some of the operations executed in the electronic device 1101 may be executed in another electronic device or a plurality of electronic devices (for example, the external electronic devices 1102 and 1104 or the server 1106). According to an embodiment, when the electronic device 1101 has to perform some functions or services automatically or in response to a request, the electronic device 1101 may request another device (for example, the external electronic device 1102 or 1104 or the server 1106) to perform at least some functions relating thereto instead of, or in addition to, performing the functions or services by itself. Another electronic device (for example, the external electronic device 1102 or 1104, or the server 1106) may execute the requested functions or the additional functions, and may deliver a result of the execution to the electronic device 1101. The electronic device 1101 may provide the received result as it is, or may additionally process the received result to provide the requested functions or services. To this end, for example, cloud computing, distributed computing, or client-server computing technology may be used.

Figure 12:
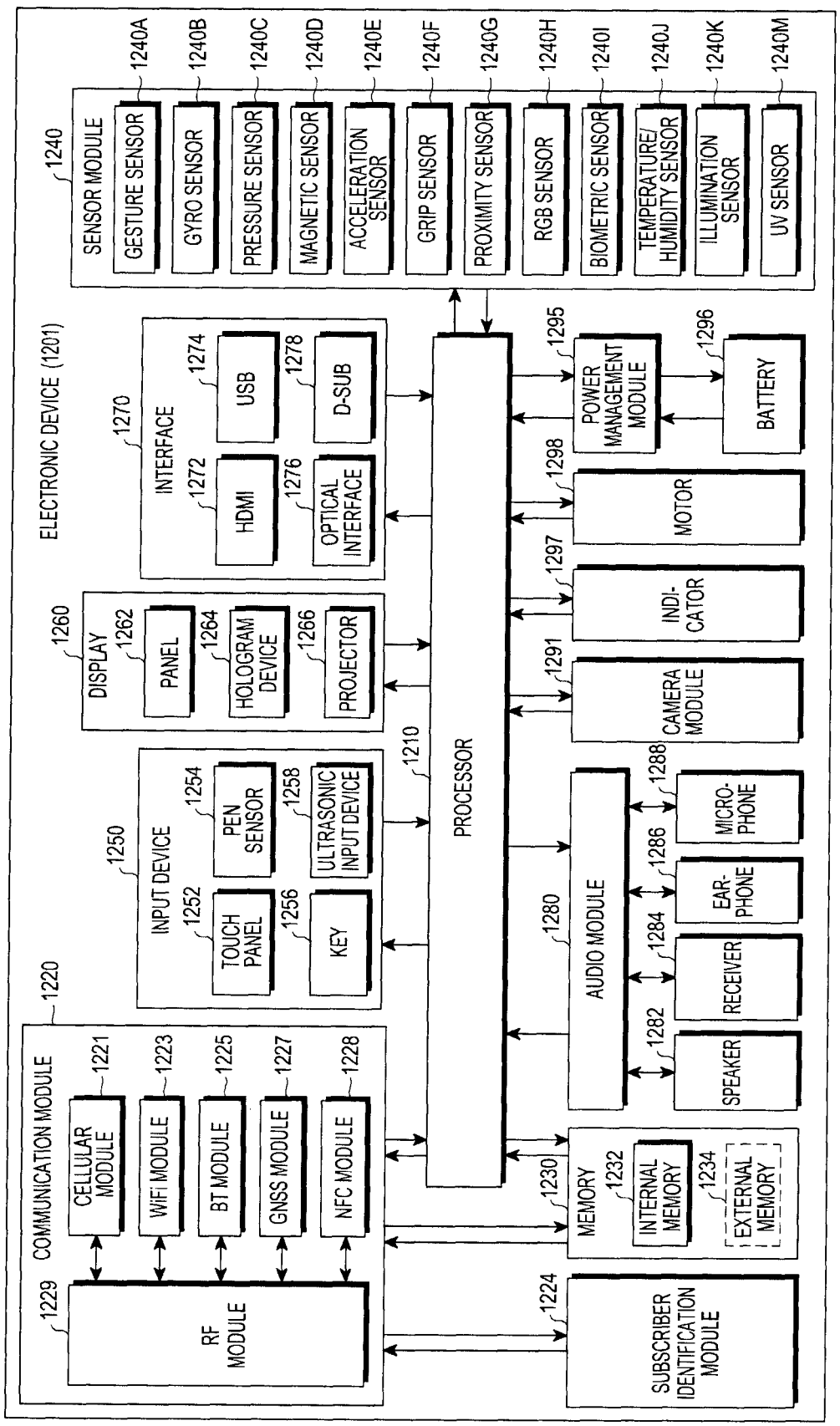
FIG. 12 illustrates a block diagram of an electronic device according to one embodiment of the present disclosure.

FIG. 12 illustrates a block diagram of an electronic device according to one embodiment of the present disclosure.

FIG. 12 is a block diagram of an electronic device 1201 according to one embodiment. The electronic device 1201 may include, for example, the entirety or a part of the electronic device 1101 illustrated in FIG. 11. The electronic device 1201 may include at least one Application Processor (AP) 1210, a communication module 1220, a subscriber identification module 1224, a memory 1230, a sensor module 1240, an input device 1250, a display 1260, an interface 1270, an audio module 1280, a camera module 1291, a power management module 1295, a battery 1296, an indicator 1297, and a motor 1298.

Figure 2:
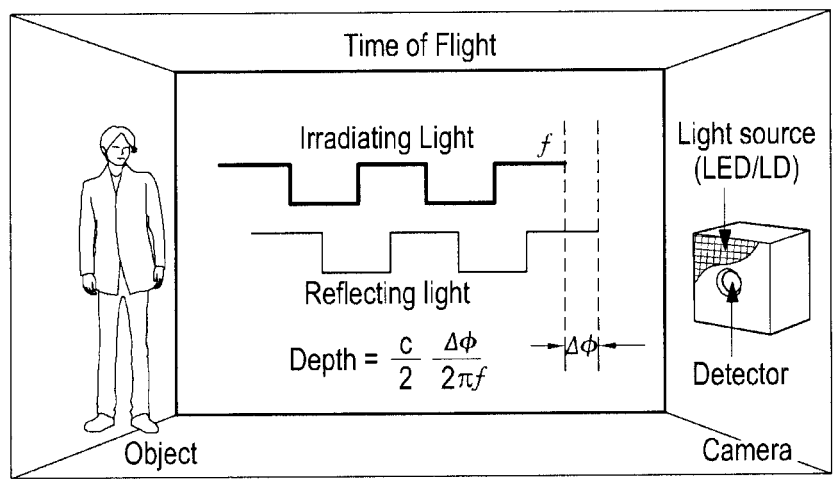

The processor 1210 may drive, for example, an operating system or application programs to control a plurality of hardware or software elements connected thereto and may perform various types of data processing and operations. The processor 1210 may be embodied, for example, as a System on Chip (SoC). According to an embodiment, the processor 1210 may further include a Graphic Processing Unit (GPU) and/or an image signal processor. The processor 1210 may also include at least some (for example, a cellular module 1221) of the elements illustrated in FIG. 2. The processor 1210 may load, in a volatile memory, instructions or data received from at least one of the other elements (for example, a non-volatile memory) to process the loaded instructions or data, and may store various types of data in the non-volatile memory.

The communication module 1220 may have a configuration equal or similar to that of the communication interface 1170 of FIG. 11. The communication module 1220 may include, for example, a cellular module 1221, a Wi-Fi module 1223, a BT module 1225, a GNSS module 1227 (for example, a GPS module, a Glonass module, a Beidou module, or a Galileo module), an NFC module 1228, and a Radio Frequency (RF) module 1229.

The cellular module 1221 may provide, for example, a voice call, a video call, a text message service, an Internet service, and the like through a communication network. According to an embodiment, the cellular module 1221 may identify and authenticate the electronic device 1201 within a communication network using the subscriber identification module 1224 (for example, a SIM card). According to an embodiment, the cellular module 1221 may perform at least some of the functions that the processor 1210 may provide. According to an embodiment, the cellular module 1221 may include a Communication Processor (CP).

The Wi-Fi module 1223, the BT module 1225, the GNSS module 1227, or the NFC module 1228 may include, for example, a processor for processing data that is transmitted and received through the corresponding module. According to some embodiments, at least some (two or more) of the cellular module 1221, the Wi-Fi module 1223, the Bluetooth module 1225, the GNSS module 1227, and the NFC module 1228 may be included in one Integrated Chip (IC) or IC package.

The RF module 1229, for example, may transmit/receive a communication signal (for example, an RF signal). The RF module 1229 may include, for example, a transceiver, a Power Amplifier Module (PAM), a frequency filter, a Low Noise Amplifier (LNA), an antenna, and the like. According to another embodiment, at least one of the cellular module 1221, the Wi-Fi module 1223, the BT module 1225, the GNSS module 1227, and the NFC module 1228 may transmit/receive an RF signal through a separate RF module.

The subscriber identification module 1224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 1230 (for example, the memory 1130) may include, for example, an internal memory 1232 or an external memory 1234. The internal memory 1232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 1234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 1234 may be functionally and/or physically connected to the electronic device 1201 through various interfaces.

The sensor module 1240 may, for example, measure a physical quantity or detect the operating state of the electronic device 1201 and may convert the measured or detected information into an electrical signal. The sensor module 1240 may include, for example, at least one of a gesture sensor 1240A, a gyro sensor 1240B, an atmospheric pressure sensor 1240C, a magnetic sensor 1240D, an acceleration sensor 1240E, a grip sensor 1240F, a proximity sensor 1240G a color sensor 1240H (for example, a Red, Green, and Blue (RGB) sensor), a biometric sensor 1240I, a temperature/humidity sensor 1240J, an illumination sensor 1240K, and a ultraviolet (UV) sensor 1240M. Additionally or alternatively, the sensor module 1240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1240 may further include a control circuit for controlling one or more sensors included therein. In some embodiments, the electronic device 1201 may further include a processor configured to control the sensor module 1240 as a part of, or separately from, the processor 1210, and may control the sensor module 1240 while the processor 1210 is in a sleep state.

The input device 1250 may include, for example, a touch panel 1252, a (digital) pen sensor 1254, a key 1256, or an ultrasonic input unit 1258. The touch panel 1252 may use, for example, at least one of a capacitive type, a resistive type, an infrared type, and an ultrasonic type. Furthermore, the touch panel 1252 may further include a control circuit. The touch panel 1252 may further include a tactile layer to provide a tactile reaction to a user.

The (digital) pen sensor 1254 may include, for example, a recognition sheet that is a part of, or separate from, the touch panel. The key 1256 may include, for example, a physical button, an optical key, or a keypad. The ultrasonic input device 1258 may detect ultrasonic waves, which are generated by an input tool, through a microphone (for example, a microphone 1288) to identify data corresponding to the detected ultrasonic waves.

The display 1260 (for example, the display 1160) may include a panel 1262, a hologram device 1264 or a projector 1266. The panel 1262 may have a configuration that is the same as, or similar to, that of the display 1160 illustrated in FIG. 11. The panel 1262 may be implemented to be, for example, flexible, transparent, or wearable. The panel 1262, together with the touch panel 1252, may be implemented as one module. The hologram device 1264 may show a three dimensional image in the air by using an interference of light. The projector 1266 may display an image by projecting light onto a screen. The screen may be located, for example, in the interior of, or on the exterior of, the electronic device 1201. According to an embodiment, the display 1260 may further include a control circuit for controlling the panel 1262, the hologram device 1264, or the projector 1266.

The interface 1270 may include, for example, a High-Definition Multimedia Interface (HDMI) 1272, a Universal Serial Bus (USB) 1274, an optical interface 1276, or a D-subminiature (D-sub) 1278. The interface 1270 may be included, for example, in the communication interface 1170 illustrated in FIG. 11. Additionally or alternatively, the interface 1270 may include, for example, a Mobile High-definition Link (MHL) interface, a Secure Digital (SD) card/Multi-Media Card (MMC) interface, or an Infrared Data Association (IrDA) standard interface.

The audio module 1280 may convert, for example, a sound into an electrical signal, and vice versa. At least some elements of the audio module 1280 may be included, for example, in the input/output interface 1150 illustrated in FIG. 11. The audio module 1280 may process sound information that is input or output through, for example, a speaker 1282, a receiver 1284, earphones 1286, the microphone 1288, and the like.

The camera module 1291 is a device that can photograph a still image and a moving image. According to an embodiment, the camera module 1291 may include one or more image sensors (for example, a front sensor or a rear sensor), a lens, an Image Signal Processor (ISP), or a flash (for example, an LED or xenon lamp).

The power management module 1295 may manage, for example, the power of the electronic device 1201. According to an embodiment, the power management module 1295 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 1296 and a voltage, current, or temperature while charging. The battery 1296 may include, for example, a rechargeable battery and/or a solar battery.

The indicator 1297 may indicate a particular state (for example, a booting state, a message state, a charging state, and the like) of the electronic device 1201 or a part (for example, the processor 1210) thereof. The motor 1298 may convert an electrical signal into a mechanical vibration and may generate a vibration, a haptic effect, and the like. Although not illustrated, the electronic device 1201 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Figure 13:
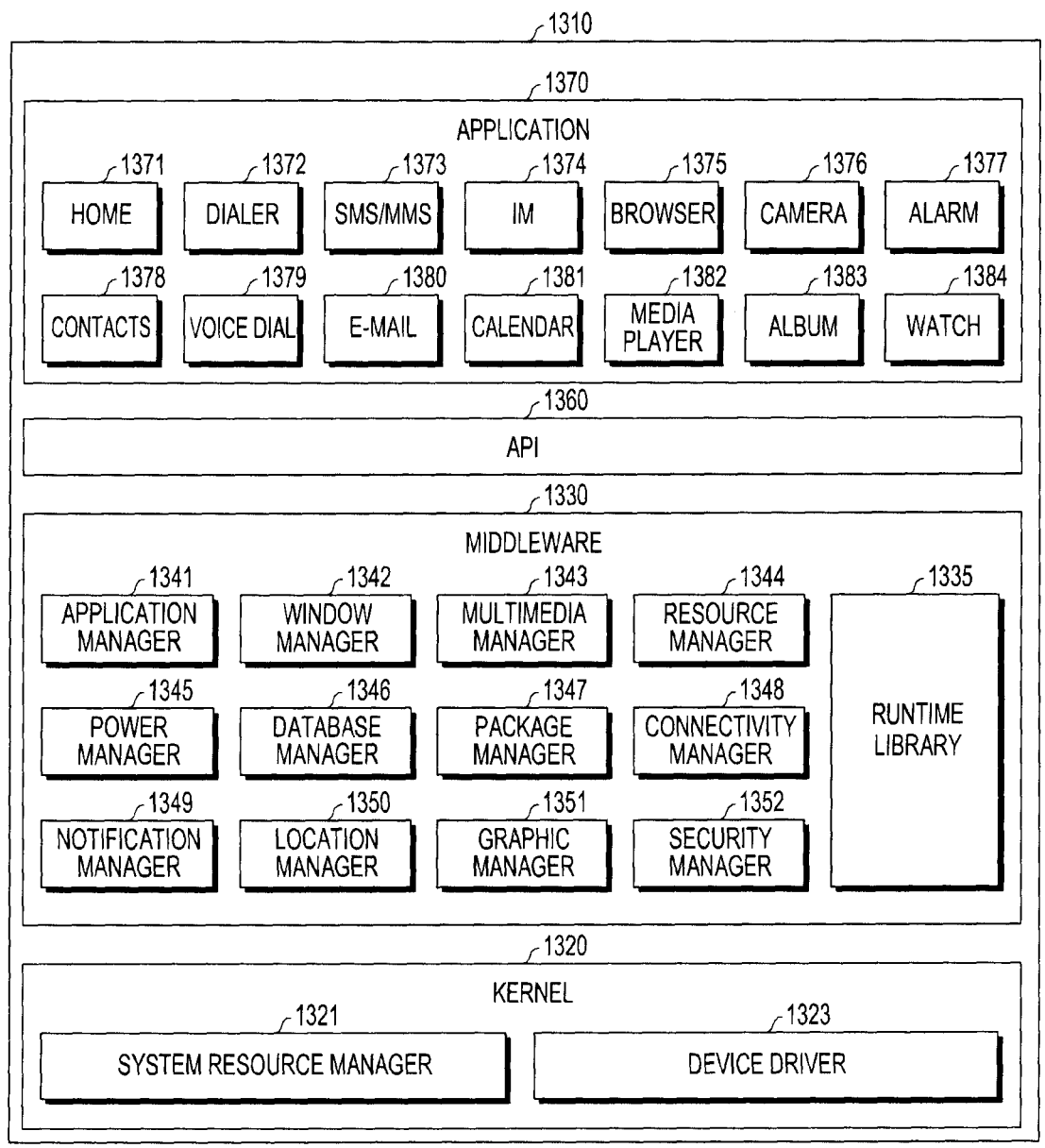
FIG. 13 illustrates a block diagram of a program module according to one embodiment of the present disclosure.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination. FIG. 13 illustrates an example for describing a program module according to various embodiments of the present disclosure.

FIG. 13 is a block diagram of the program module according to one embodiment. According to an embodiment, the program module 1310 (for example, the program 1140) may include an Operating System (OS) that controls resources relating to an electronic device (for example, the electronic device 1101) and/or various applications (for example, the application programs 147) that are executed in the operating system. The operating system may be, for example, Android, iOS, Windows, Symbian, Tizen, Bada, and the like The program module 1310 may include a kernel 1320, middleware 1330, an Application Programming Interface (API) 1360, and/or applications 1370. At least a part of the program module 1310 may be preloaded on the electronic device, or may be downloaded from an external electronic device (for example, the external electronic device 1102 or 1104 or the server 1106).

The kernel 1320 (for example, the kernel 1141) may include, for example, a system resource manager 1321 and/or a device driver 1323. The system resource manager 1321 may control, allocate, or retrieve system resources. According to an embodiment, the system resource manager 1321 may include a process manager, a memory manager, a file system manager, and the like. The device driver 1323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 1330 may provide a function required by the applications 1370 in common or provide various functions to the applications 1370 through the API 1360 so that the applications 1370 can efficiently use limited system resources within the electronic device. According to an embodiment, the middleware 1330 (for example, the middleware 1143) may include, for example, at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 13851, and a security manager 1352.

The runtime library 1335 may include, for example, a library module that a compiler uses in order to add a new function through a programming language while the applications 1370 are being executed. The runtime library 1335 may perform input/output management, memory management, the functionality for an arithmetic function, and the like.

The application manager 1341 may manage, for example, the life cycle of at least one of the applications 1370. The window manager 1342 may manage Graphical User Interface (GUI) resources used on a screen. The multimedia manager 1343 may determine formats required to reproduce various media files and may encode or decode a media file using a coder/decoder (codec) appropriate for the corresponding format. The resource manager 1344 may manage resources, such as the source code, the memory, the storage space, and the like of at least one of the applications 1370.

The power manager 1345 may operate together with, for example, a Basic Input/Output System (BIOS) to manage a battery or power and provide power information required for the operation of the electronic device. The database manager 1346 may generate, search for, and/or change a database to be used by at least one of the applications 1370. The package manager 1347 may manage the installation or update of an application that is distributed in the form of a package file.

The connectivity manager 1348 may manage a wireless connection, such as Wi-Fi, Bluetooth, and the like. The notification manager 1349 may display or notify of an event, such as an arrival message, an appointment, a proximity notification, and the like, in such a manner as not to disturb a user. The location manager 1350 may manage the location information of the electronic device. The graphic manager 1351 may manage a graphic effect to be provided to a user and a user interface relating to the graphic effect. The security manager 1352 may provide various security functions required for system security, user authentication, and the like. According to an embodiment, in a case where the electronic device (for example, the electronic device 1101) has a telephone call function, the middleware 1330 may further include a telephony manager for managing a voice or video call function of the electronic device.

The middleware 1330 may include a middleware module that forms a combination of various functions of the above-described elements. The middleware 1330 may provide specialized modules according to the types of operating systems in order to provide differentiated functions. Furthermore, the middleware 1330 may dynamically remove some of the existing elements, or may add new elements.

The API 1360 (for example, the API 1145) is, for example, a set of API programming functions, and may be provided with different configurations according to operating systems. For example, in the case of Android or iOS, one API set may be provided for each platform, and in the case of Tizen, two or more API sets may be provided for each platform.

The applications 1370 (for example, the application programs 1147) may include one or more applications that can perform functions, for example, home 1371, dialer 1372, SMS/MMS 1373, Instant Message (IM) 1374, browser 1375, camera 1376, alarm 1377, contacts 1378, voice dial 1379, e-mail 1380, calendar 1381, media player 1382, album 1383, clock 1384, health care (for example, measuring exercise quantity or blood sugar), and environment information (for example, atmospheric pressure, humidity, temperature information, and the like).

According to an embodiment, the applications 1370 may include an application (hereinafter, referred to as an "information exchange application" for convenience of description) that supports information exchange between the electronic device (for example, the electronic device 1101) and an external electronic device (for example, the external electronic device 1102 or 1104). The information exchange application may include, for example, a notification relay application for transferring specific information to an external electronic device or a device management application for managing an external electronic device.

For example, the notification relay application may include a function of transferring, to the external electronic device (for example, the external electronic device 1102 or 1104), notification information that is generated from the other applications (for example, the SMS/MMS application, the e-mail application, the health care application, the environmental information application, and the like) of the electronic device. Furthermore, the notification relay application may, for example, receive notification information from the external electronic device and may provide the received notification information to a user.

The device management application may manage (for example, install, delete, or update), for example, at least one function of an external electronic device (for example, the external electronic device 1102 or 1104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 1370 may include applications (for example, a health care application of a mobile medical appliance, and the like) that are specified according to attributes of an external electronic device (for example, the external electronic device 1102 or 1104). According to an embodiment, the applications 1370 may include applications that are received from an external electronic device (for example, the server 1106, or the external electronic device 1102 or 1104). According to an embodiment, the applications 1370 may include preloaded applications or third-party applications that can be downloaded from a server. Names of the elements of the program module 1310, according to the above-described embodiments of the present disclosure, may change depending on the type of OS.

According to an embodiment, at least a part of the program module 1310 may be implemented in software, firmware, hardware, or a combination of two or more thereof. At least some of the program module 1310 may be implemented (for example, executed) by, for example, the processor (for example, the processor 1210). At least some of the program module 1310 may include, for example, a module, a program, a routine, a set of instructions, and/or a process for performing one or more functions. The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 1120), may cause the one or more processors to execute the function corresponding to the instruction. The computer-readable storage medium may be, for example, the memory 1130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
    a camera;
    a sensor module; and
    a processor, wherein the processor is configured to:
        determine at least one of a movement of the electronic device and a movement of an object in images acquired by the camera, wherein determining movement comprises:
            determining distance of the object using light outputted by the sensor module at a first time, and
            determining a number of pixels that the object has moved in the images,
        determine, based on the movement of the electronic device or the movement of the object, an output period for light outputted by the sensor module, and
        determine depth information of the images based on reflected light received by the camera corresponding to the outputted light with the output period at a second time.

2. The electronic device of claim 1, wherein, when a value of the movement of the electronic device is larger than a predetermined value, the processor is further configured to select a relatively short output period.

3. The electronic device of claim 1, wherein, when a value of the movement of the electronic device is equal to or smaller than a predetermined value, the processor is further configured to determine the output period based on the movement of the object in the images.

4. The electronic device of claim 3, wherein the images are preview images acquired by the camera.

5. The electronic device of claim 3, wherein the processor is further configured to determine the movement of the object based on a change in image information in the images.

6. The electronic device of claim 1, wherein the sensor module includes at least one of an infrared (IR) sensor, a gyro sensor, and an acceleration sensor.

7. The electronic device of claim 1, wherein the processor is further configured to match RGB information and depth information of the images in order to generate three dimensional images corresponding to the images.

8. A non-transitory computer-readable recording medium storing instructions configured to cause a processor to perform at least one operation, the at least one operation comprising:
    determining at least one of a movement of an electronic device and a movement of an object in images acquired by a camera, wherein determining movement comprises:
        determining distance of the object using light outputted by a sensor module at a first time, and
        determining a number of pixels that the object has moved in the images;
    determining, based on the movement of the electronic device or the movement of the object, an output period for light outputted by the sensor module; and
    determining depth information of the images based on reflected light received by the camera corresponding to the outputted light with the output at a second time.

9. The non-transitory computer-readable recording medium of claim 8, wherein the determining of the output period comprises, when a value of the movement of the electronic device is larger than a predetermined value, selecting a relatively short output period.

10. The non-transitory computer-readable recording medium of claim 8, wherein the determining of the output period comprises, when a value of the movement of the electronic device is equal to or smaller than a predetermined value, determining the output period based on the movement of the object in the images.

11. The non-transitory computer-readable recording medium of claim 10, wherein the images are preview images acquired by the camera.

12. The non-transitory computer-readable recording medium of claim 10, wherein the at least one operation further comprises determining the movement of the object based on a change in image information in the images.

13. The non-transitory computer-readable recording medium of claim 8, wherein the sensor module includes at least one of an infrared (IR) sensor, a gyro sensor, and an acceleration sensor.

14. The non-transitory computer-readable recording medium of claim 8, wherein at least one operation further comprises matching RGB information and depth information of the images in order to generate three dimensional images for the images.

15. A method of controlling an electronic device, the method comprising:

determining at least one of a movement of an electronic device and a movement of an object in images acquired by a camera, wherein determining movement comprises:
  determining distance of the object using light outputted by a sensor module at a first time, and
  determining a number of pixels that the object has moved in the images;
determining, based on the movement of the electronic device or the movement of the object, an output period for light outputted by the sensor module; and
determining depth information of the image based on reflected light received by the camera corresponding to the outputted light with the output period at a second time.

* * * * *